United States Patent Office
3,107,531
Patented Oct. 22, 1963

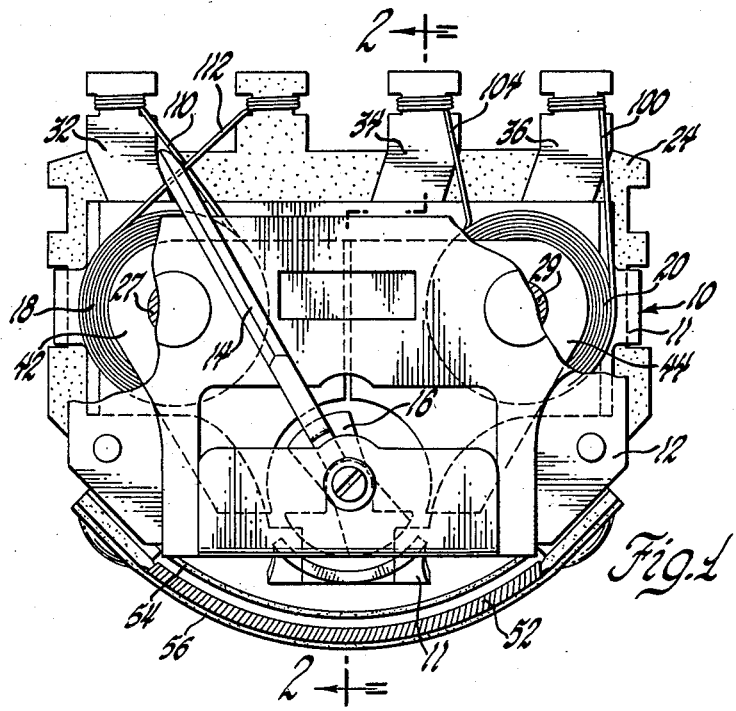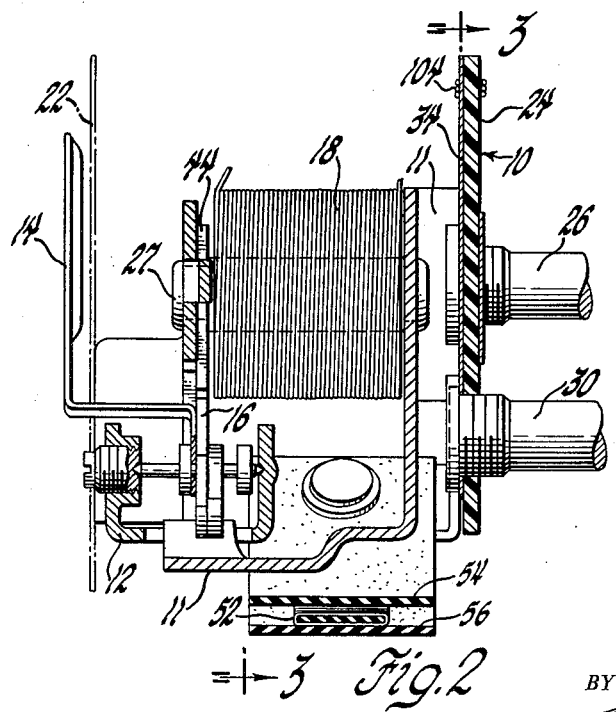

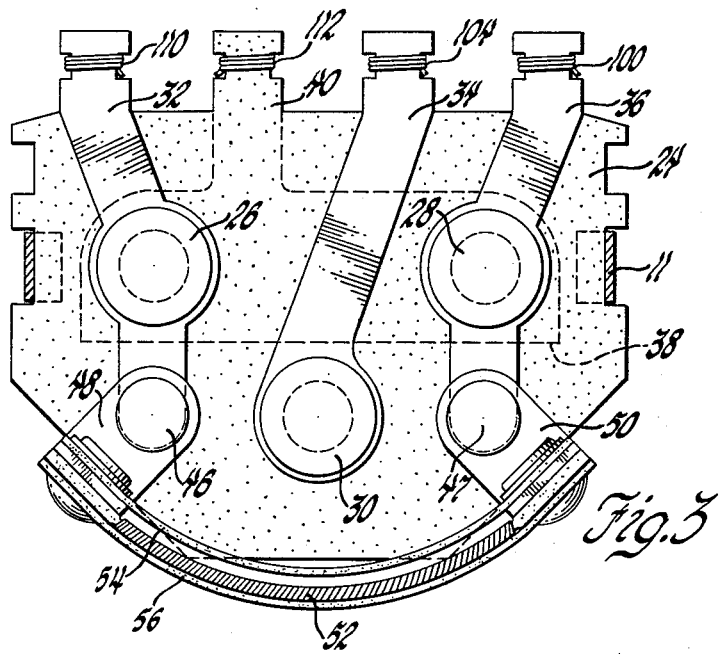
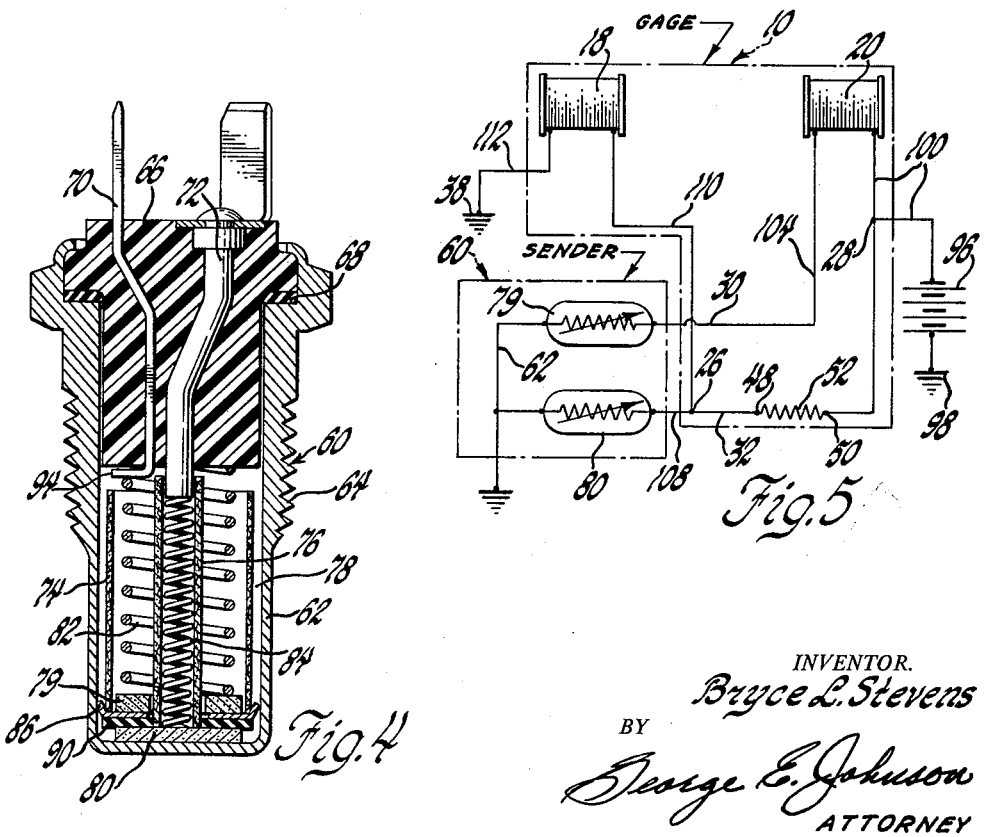

3,107,531
ELECTRICAL TEMPERATURE INDICATING
SYSTEMS
Bryce L. Stevens, Davison, Mich., assignor to General
Motors Corporation, Detroit, Mich., a corporation of
Delaware
Filed Jan. 28, 1960, Ser. No. 5,201
4 Claims. (Cl. 73—362)

This invention relates to differential galvanometers and particularly to indicating systems of the electric telemetric type for showing tempertaure variations in installations such, for example, as in connection with cooling systems of automobile engines.

An object of the present invention is to provide an improved low-cost temperature indicating system of the telemetric type.

A feature of the present invention is an indicating system employing two thermistors in a sender or in sending means for effecting the differential energization of two actuating coils in a data receiving galvanometer unit or gage.

This and other features of the invention will now be described in detail in the specification and then pointed out more particularly in the appended claims.

In the drawings:

FIGURE 1 is a front view of a gage with the dial and casting omitted;

FIGURE 2 is a side view of gage parts, some of the parts being shown in section as taken along the line 2—2 in FIGURE 1 and the dial being shown in dot and dash lines;

FIGURE 3 is a sectional view taken along the line 3—3 in FIGURE 2;

FIGURE 4 is a sectional view through sending means in the form of a double thermistor; and FIGURE 5 is a diagrammatic view of the circuit employed.

The term "thermistor" is herein used to denote a semiconductor having a thermally variable resistivity. In the production of thermistors, the oxides of the transistion metals, combinations thereof, electro-ceramics, ferromagnetics and other materials have been used dependent upon the temperature and electrical characteristics desired for each installation.

When the temperature is constant, a thermistor reflects Ohm's law at low applied voltage. With an increase in voltage a thermistor heats up and its electrical resistance decreases. A single thermistor has been used heretofore in connection with a telemetric type gage but such use has introduced an additional electro-magnetic coil and other complications. In applying two thermistors for sensing temperature changes as herein indicated, the present invention realizes these advantages:

(1) A nearly linear scale is permitted for the gage;
(2) A strong pointer movement is attained;
(3) The gage structure may be symmetrical and therefore low in cost;
(4) Undistorted magnetic field gives gage stability;
(5) Identical coils eliminate errors due to ambient temperature changes.

The gage 10, as shown in the drawings, is similar in some respects, to that of the gage shown in the United States Patent No. 2,178,108, granted October 31, 1939, in the name of Bruce H. Schwarze. The present gage comprises a lower iron pole piece 11, a brass frame 12, a pointer 14, an iron armature 16 which is adapted to rotate with the pointer, and two electro-magnetic coils 18 and 20 for actuating the armature and pointer with respect to a dial 22. A base 24 of insulating material (plastic) serves to insulate the frame 12 from the instrument casing which is not shown. Terminal studs 26, 28 and 30 (FIGURE 3) are provided and they pass through the base and are insulated from the frame 12. Three copper clad contact areas 32, 34 and 36 are formed on the front side of the plastic base 24 and contact the heads of the studs. A fourth copper contact area 38 is formed on the other or back side of the plastic base 24 and bears a tab 40. This fourth area serves as a ground connection to the casing but is clear of the studs 26 and 28. In axial alignment with the studs 26 and 28 are two iron cores 27 and 29 held at their rear ends by the lower pole piece 11 and which, at their front ends, are retained by the brass frame 12. These cores support two upper iron pole pieces 42 and 44 respectively. The pole pieces 11, 42 and 44 form arcuate clearances or air spaces about the paths of the ends of the armature 16. Rivets 46 and 47 (FIGURE 3) pass through the base 24 and hold right angle conductor elements 48 and 50 for supporting a resistance 52 in the form of a coil shielded by two insulating strips 54 and 56.

FIGURE 4 shows sending means 60 in the form of a double thermistor. It comprises a brass housing 62 bearing screw threads 64 by means of which the unit may be attached to an engine block. A plastic element 66 is held within the housing 62 with a sealing washer 68 interposed between opposing shoulders formed on the two parts. Two terminals 70 and 72 are moulded into the element 66. Coaxial vulcanized fiber sleeves 74 and 76 are located within a chamber 78 defined in the housing. Two discs 79 and 80 of semiconductor material forming the hearts of the thermistors are urged toward the base of the housing by two coil springs 82 and 84 respectively. The sleeve 74 is spaced from the inner wall surface of the chamber with one end abutting a metal grounding disc 86 surrounding the tube 76. The disc 86 contacts one surface of the semiconductor 79. The other side of the disc 86 is insulated by a fiber washer 90 from the semiconductor 80. The spring 82 acts between an angle portion 94 of the terminal 70 and the semiconductor 79. The spring 84 acts between the inner end of the terminal 72 and the semiconductor disc 80 and is insulated from the spring 82 and the discs 79 and 86 by the sleeve 76 as well as by a transformer type oil or liquid substantially filling the chamber 78. This liquid could be ethylene glycol, glycerine or such type of nonconductive heat transfer liquid. The liquid used should be effective as a heat transfer medium between the housing 62 and the two thermistor semiconductor discs 79 and 80.

A source 96 of voltage supply is shown as a battery in FIGURE 5. The negative or positive side is grounded as at 98 and the other side is connected in series with the coil 20 and the thermistor disc 79 by a line 100, the stud 28, the copper area 36, the lines 100 and 104, the copper area 34, the stud 30 and the housing 62. The copper area 36 also connects the stud 28 to the conductor element 50 or one acting terminal of the resistor 52. The other terminal of the resistor includes the element 48 contacting the copper coating 32 which is connected by the stud 26 and a line 108 to the terminal 72 leading to one side of the thermistor 80. The latter is grounded by the housing 62. The coating 32 is also connected by a line 110 to one end of the coil 18. The other end of the latter is connected by a line 112 to the coating 38 forming a ground with the gage casing.

In operation and assuming that the sending means 60 is subjected to a rising temperature condition, the resistance of the thermistors or discs 79 and 80 will decrease. The decrease in the resistance of the thermistor 80 causes an increase in the current through the resistance 52 with a consequent increase in the voltage drop across the resistor 52. This, of course, means that the potential at 26 is lowered with a resulting decrease in the current passing through the coil 18.

I claim:
1. An indicating system comprising sender means having two thermistors arranged in parallel and adapted to be exposed to varying temperature, a differential galvanometer type gage having two actuating coils, a voltage source, a resistor connected in series with one of said coils and one of said thermistors to said voltage source, said one coil and one thermistor being connected in parallel, and the other of said coils being connected to said voltage source and in series with the other of said thermistors.

2. An indicating system comprising sender means with two thermistors arranged in parallel, a differential galvanometer type gage spaced from said sender means as a separate indicating unit and having two actuating coils, a resistor in said indicating unit, one of said coils and one of said thermistors being connected in parallel to an output terminal of said resistor, and the other coil and other thermistor being connected in series.

3. An indicating system comprising a sending unit having two thermistors and adapted to be exposed to a variable temperature in one locality, a receiving unit in the form of a galvanometer type gage adapted to be mounted in another locality, said gage unit having a pointer and two actuating coils for said pointer, a resistor, a voltage source, one of said coils and said resistor being connected in series to said voltage source, one of said thermistors being connected in parallel with said one coil and in series with said resistor, and the other thermistor being connected in series with the other of said coils to said voltage source.

4. An indicating system comprising two separately grounded thermistors, a gage having a pointer and two pointer actuating electromagnetic coils, a resistor, a voltage source, one of said coils and said resistor being connected in series to said voltage source, one of said thermistors being connected in parallel with said one coil and in series with said resistor, and the other of said thermistors being connected in series with the other of said coils to said voltage source.

References Cited in the file of this patent
UNITED STATES PATENTS

| | | |
|---|---|---|
| 2,206,715 | Burat et al. | July 2, 1940 |
| 2,567,756 | Amsler | Sept. 11, 1951 |

FOREIGN PATENTS

| | | |
|---|---|---|
| 379,703 | Germany | July 4, 1922 |
| 747,828 | Great Britain | Apr. 18, 1956 |